United States Patent [19]

Asakura et al.

[11] Patent Number: 4,694,924

[45] Date of Patent: Sep. 22, 1987

[54] MOTORCYCLE

[75] Inventors: Toshimitsu Asakura, Wako; Tomoyuki Tagami, Soka, both of Japan

[73] Assignee: Honda Giken Kogyo Kabushiki Kaisha, Japan

[21] Appl. No.: 813,254

[22] Filed: Dec. 24, 1985

[51] Int. Cl.$^4$ ............................................. B62K 5/04
[52] U.S. Cl. .................................. 180/68.3; 180/229
[58] Field of Search ............. 180/219, 225, 229, 68.3; 280/5 A

[56] References Cited

U.S. PATENT DOCUMENTS 4,484,651 11/1984 Hattori et al. ........................ 180/225
4,496,019 1/1985 Tanaka ................................. 180/225

Primary Examiner—John J. Love
Assistant Examiner—Richard Camby
Attorney, Agent, or Firm—Darby & Darby

[57] ABSTRACT

A motorcycle includes a fuel tank mounted on a frame along a length thereof, and an elongated seat mounted on the frame above the fuel tank along the length of said frame, the seat having a bottom having a portion extending along the length thereof and disposed in spaced opposed relation to an upper surface of the fuel tank to form an air intake passageway therebetween. The passageway has an open front end opening toward the front end of the frame and having a rear open end. The seat has a front end disposed near a front end of the fuel tank so that the seat covers generally the entire upper surface of the fuel tank. An air cleaner is operatively connected to an engine and is disposed rearwardly of the fuel tank. The rear open end of the passageway is in communication with the air cleaner whereby the ambient air can be fed to the air cleaner through the air intake passageway.

11 Claims, 19 Drawing Figures

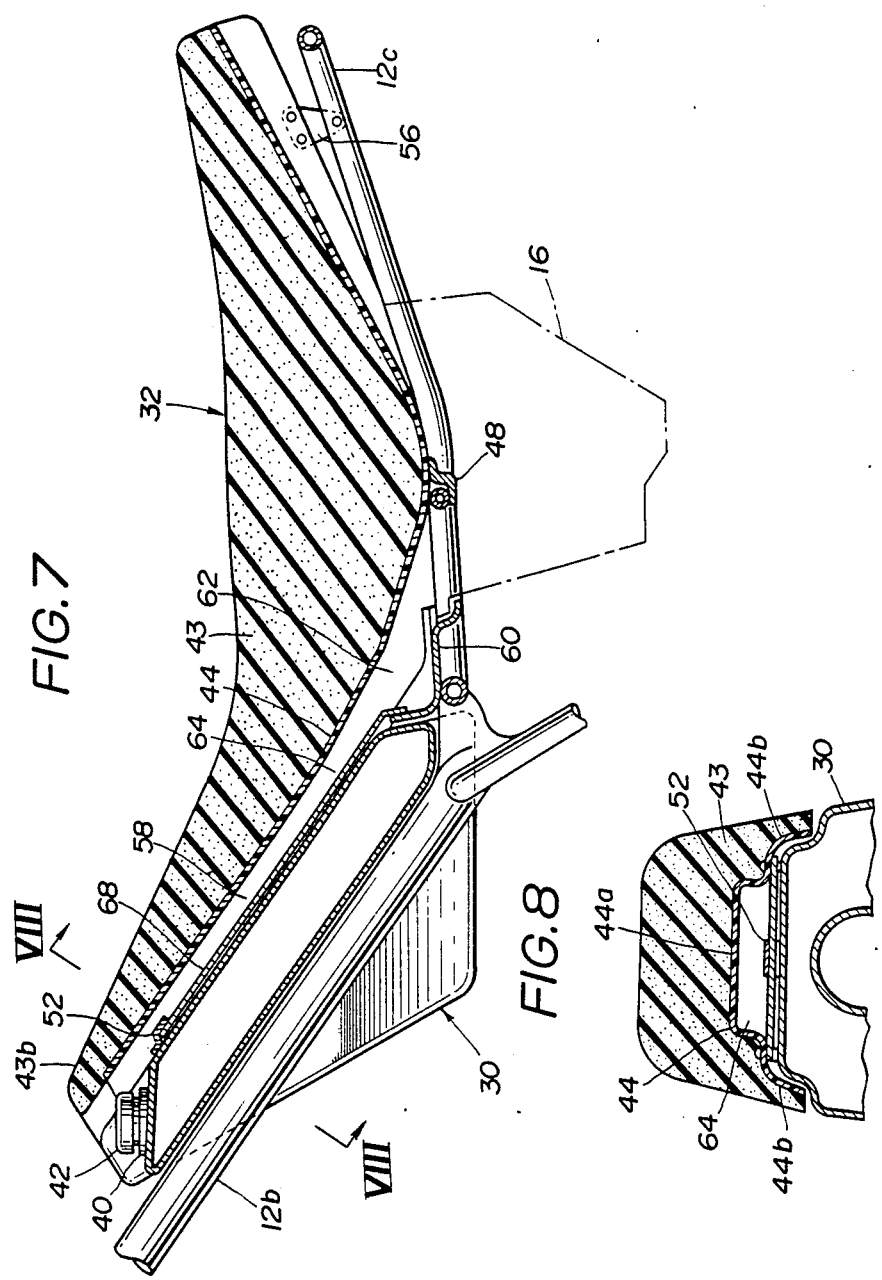

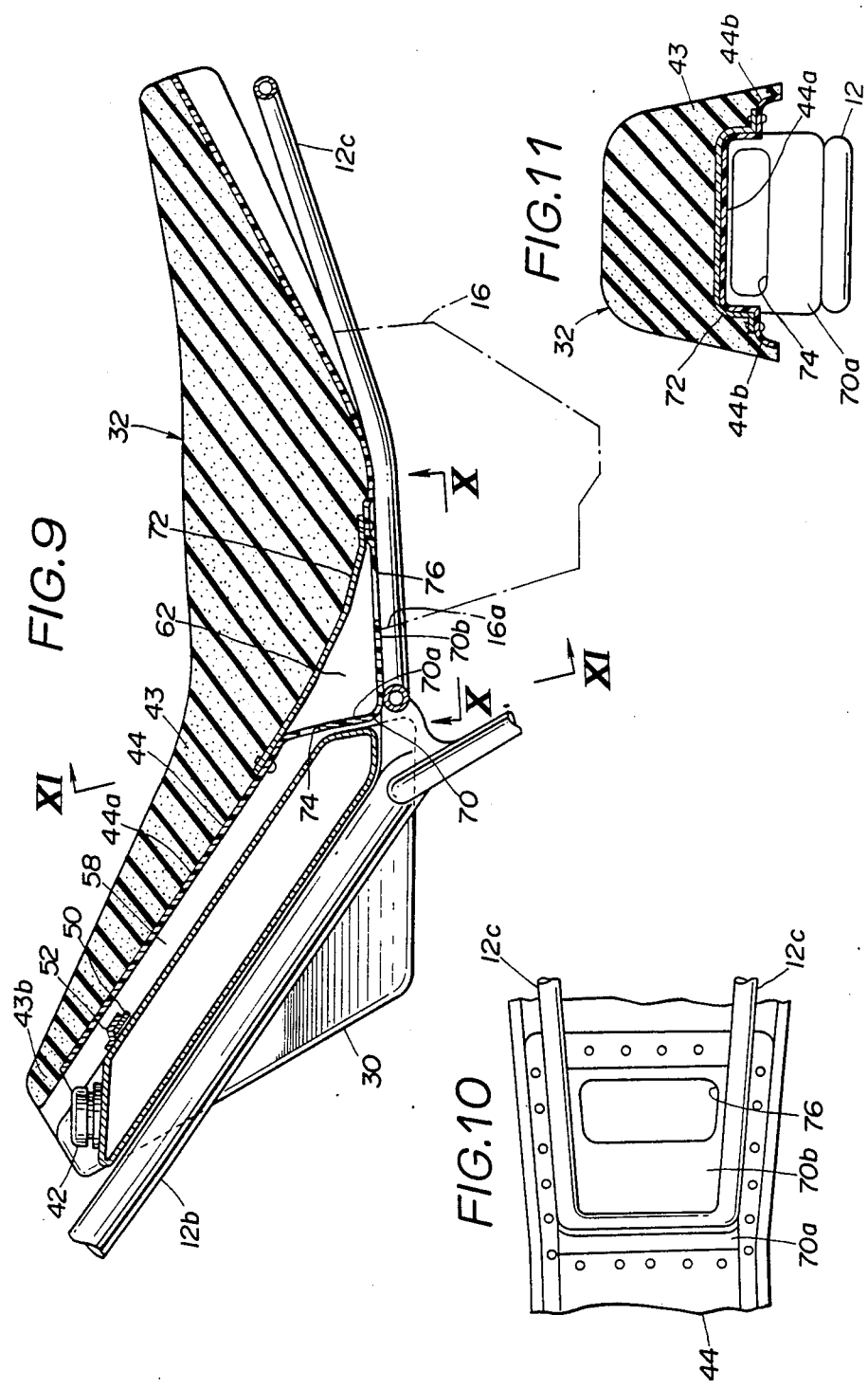

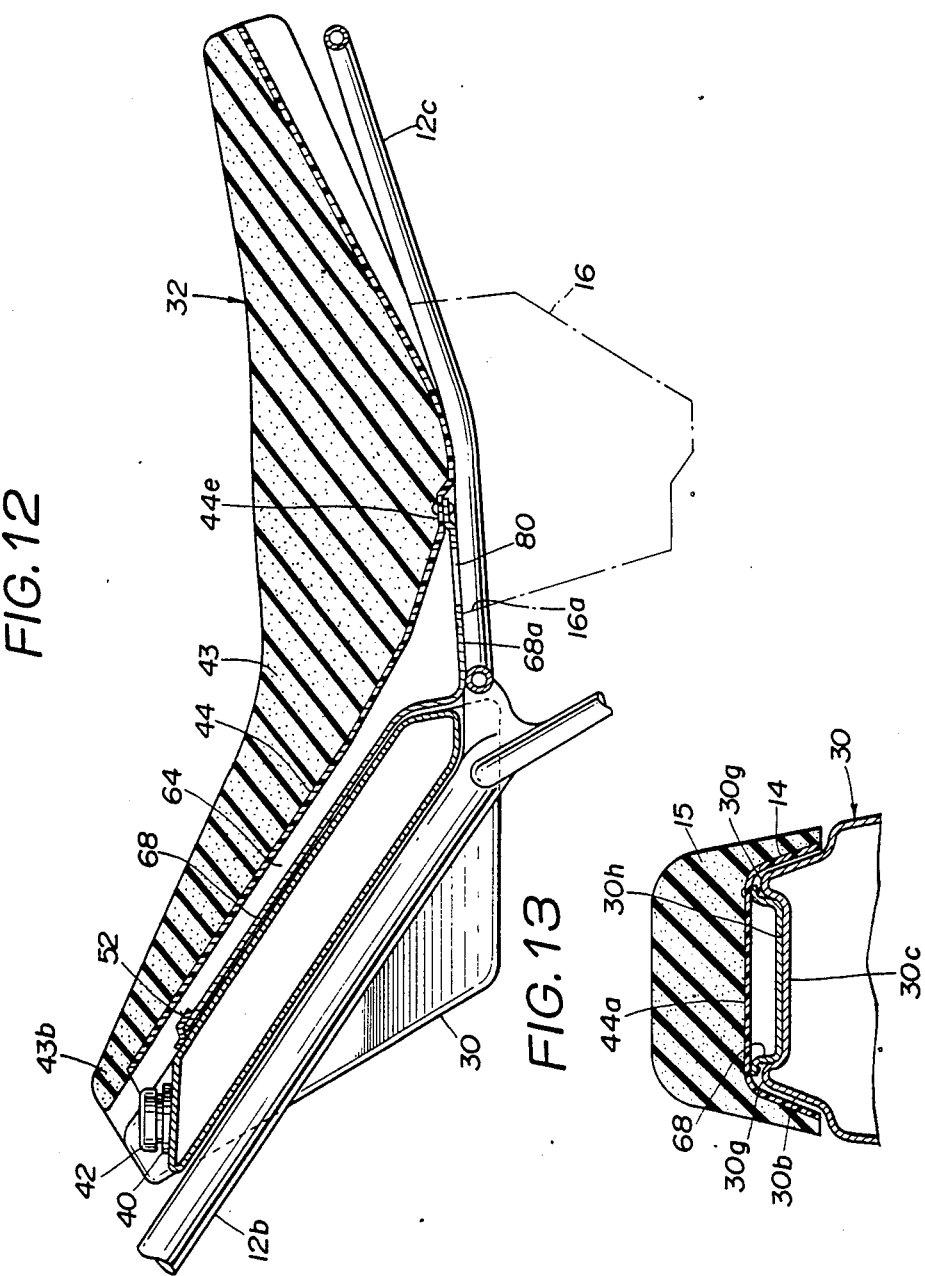

MOTORCYCLE

BACKGROUND OF THE INVENTION

1. Field of the Invention

This invention relates generally to motorcycles and particularly to air intake passageway means for feeding the ambient air to air cleaner.

2. Prior Art

Japanese Utility Model Application Laid-Open (Kokai) No. 54-136250 discloses a conventional motorcycle in which a fuel tank has a bottom wall of an inverted U-shaped cross-section and is mounted on a main pipe of a frame in spaced straddling relation thereto to provide a passageway therebetween, the main pipe extending rearwardly from a head pipe of the frame and slanting rearwardly. This passageway constitutes an air intake passageway and communicates at its rear end with an inlet of an air cleaner for feeding the ambient air thereto.

Japanese Utility Model Application Laid-Open (Kokai) No. 56-111090 discloses another conventional motorcycle which comprises a fuel tank having a bottom wall of an inverted U-shaped cross-section, and a plate of an inverted U-shaped cross-section received in the bottom wall of the fuel tank in spaced relation thereto provide a passageway therebetween, the plate being disposed astride of a main pipe of a frame. This passageway defines an air intake passageway connected to an inlet of an air cleaner.

Each of the above conventional air intake passageways is provided inside of the fuel tank, so that the fuel tank becomes rather bulky. In addition, since the above conventional fuel tanks have a unique configuration, the processing of them is rather cumbersome. Further, the air intake passageway can not be provided, using ordinary fuel tanks.

Japanese Utility Model Application Laid-Open (Kokai) No. 54-34343 discloses a motorcycle in which a seat is extended forwardly to cover a fuel cap closing an inlet of a fuel tank so as to prevent any damage to the fuel cap. The seat is hingedly mounted on the frame for angular movement so that the fuel cap is accessible. However, each time the fuel tank is to be filled with fuel, the seat must be angularly moved to gain access to the fuel cap. This operation is cumbersome.

SUMMARY OF THE INVENTION

It is therefore an object of this invention to provide a motorcycle in which an air intake passageway can be provided without having to increase the size of a fuel tank unduly.

Another object is to provide such a motorcycle in which a seat is so arranged as to cover generally the entire upper surface of the fuel tank in such a manner that a fuel cap on the upper surface of the fuel tank is easily accessible.

According to the present invention, there is provided a motorcycle comprising:

(a) an elongated frame having front and rear ends;
(b) an engine mounted on said frame;
(c) a fuel tank mounted on said frame above said engine and having an upper surface extending along a length of the frame;
(d) an elongated seat mounted on said frame above said fuel tank along the length of said frame, said seat having a bottom having a portion extending along the length thereof and disposed in spaced opposed relation to said upper surface of said fuel tank to form an air intake passageway therebetween, said passageway having an open front end opening toward the front end of said frame and having a rear open, said seat having a front end disposed near to a front end of said fuel tank so that said seat covers said upper surface of said fuel tank generally entirely; and
(e) an air cleaner operatively connected to said engine and disposed rearwardly of said fuel tank, the rear open end of said passageway being in communication with said air cleaner whereby the ambient air can be fed to said air cleaner through said air intake passageway.

BRIEF DESCRIPTION OF THE DRAWINGS

FIG. 7 is a view similar to FIG. 2 but showing a modified form of the invention;

FIG. 8 is a cross-sectional view taken along the line VIII—VIII of FIG. 7;

FIG. 9 is a view similar to FIG. 2 but showing another modified form of the invention;

FIG. 10 is a cross-sectional view taken along the line X—X of FIG. 9;

FIG. 11 is a cross-sectional view taken along the line XI—XI of FIG. 9;

FIG. 12 is a view similar to FIG. 2 but showing a further modified form of the invention;

FIG. 13 is a cross-sectional view of a portion of a further modified motorcycle;

DESCRIPTION OF THE PREFERRED EMBODIMENTS OF THE INVENTION

Figure 1:
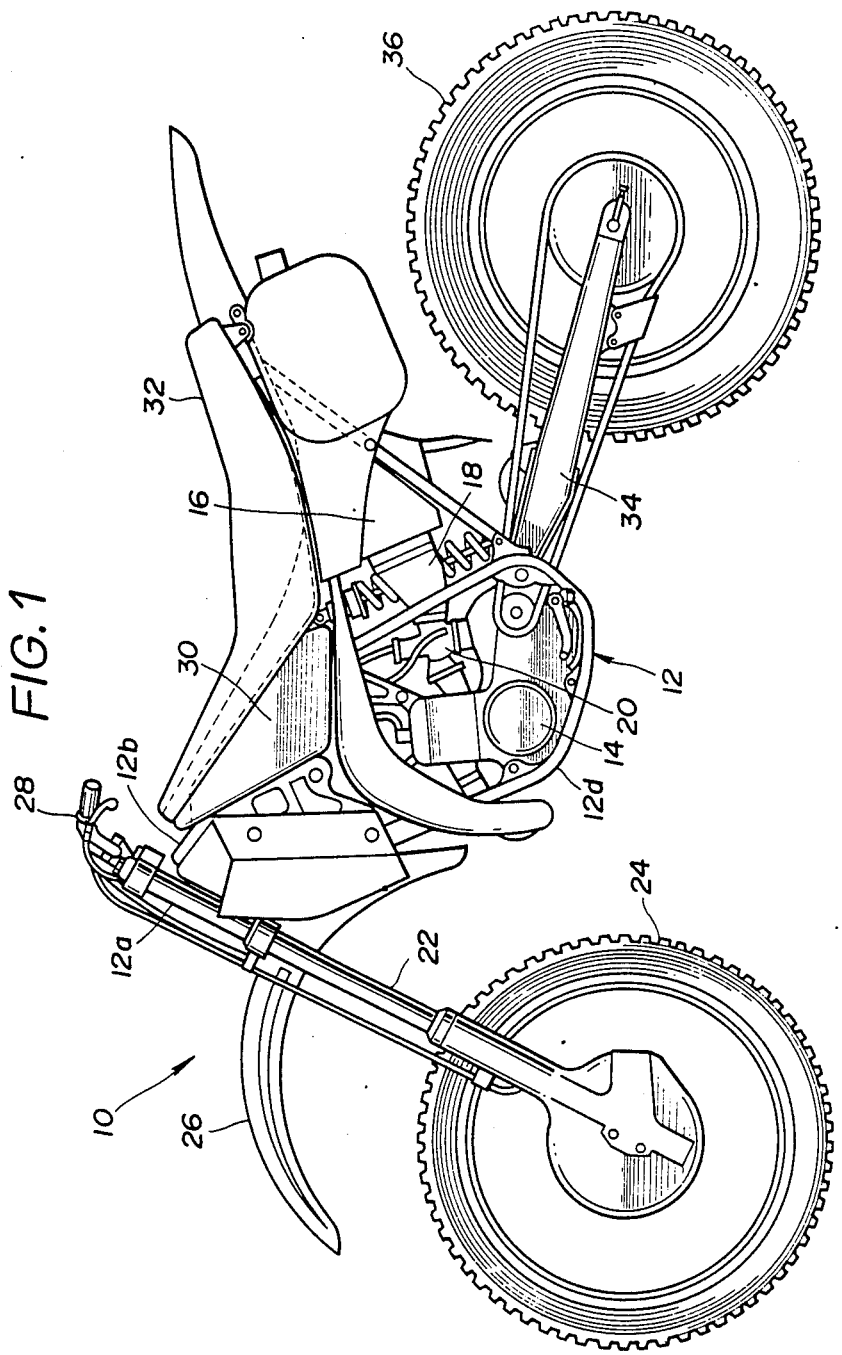
FIG. 1 is a side-elevational view of a motorcycle provided in accordance with the present invention.

The invention will now be described with reference to the drawings in which like reference numerals denote corresponding parts in several views.

A motorcycle 10 shown in FIG. 1 comprises an elongated frame 12, an engine 14 mounted on the frame 12, and an air cleaner 16 connected to a connecting tube 18 leading to a carburetor 20. The frame 12 includes a generally vertically-disposed head pipe 12a, a main pipe 12b extending rearwardly from the head pipe 12a, a pair of parallel seat rails 12c (FIG. 2) extending rearwardly from the main pipe 12b, and a loop portion 12d for supporting the engine 14. Connected to the head pipe 12a is a front fork 22 supporting a front wheel 24 through a front axle. A front fender 26 is mounted on the front fork 22. A steering handle 28 is also mounted on the head pipe 12a. A fuel tank 30 is mounted on the main pipe 12b, and a seat 32 is mounted on the seat rails 12c. A swing arms 34 of the cantilever type, only one which is shown in the drawings, are secured to a rear end portion of the frame 12 to support a rear wheel 36 through a rear axle.

Figure 2:
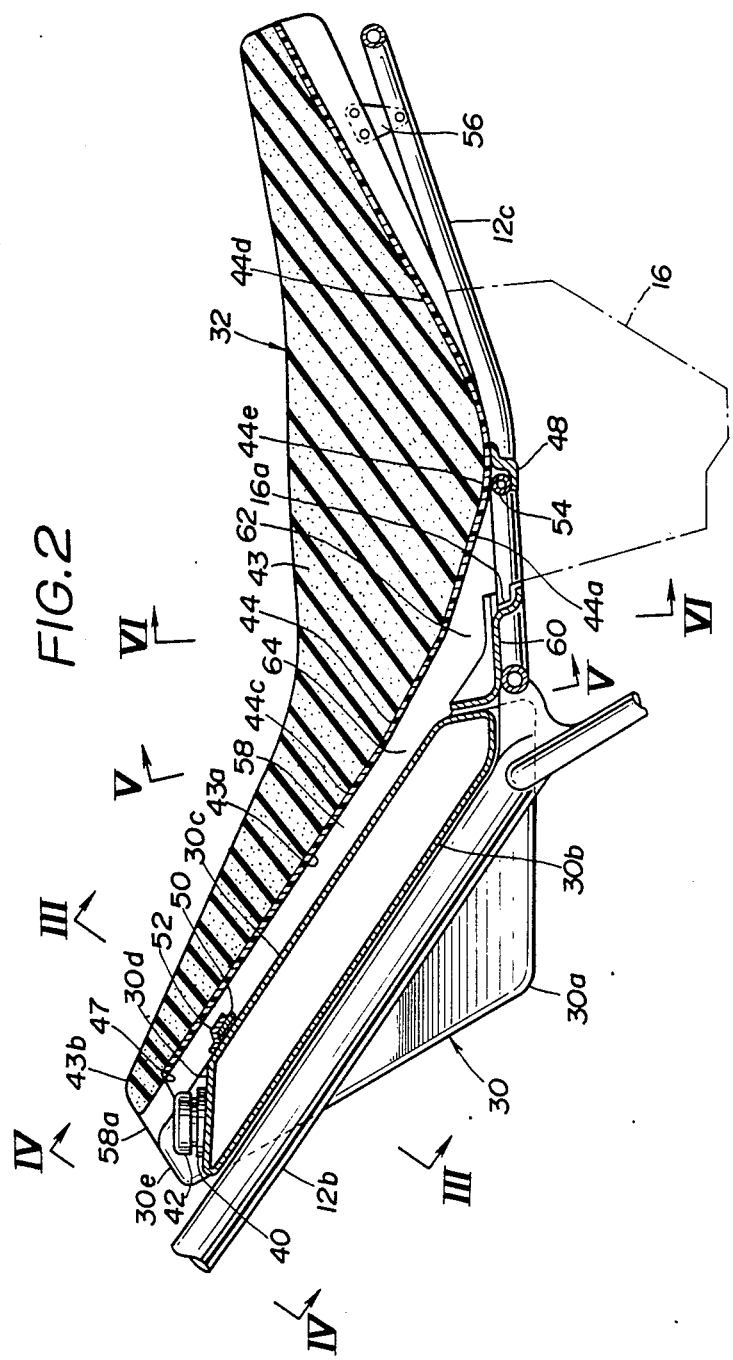
FIG. 2 is a cross-sectional view of a portion of the motorcycle.
Figure 3:
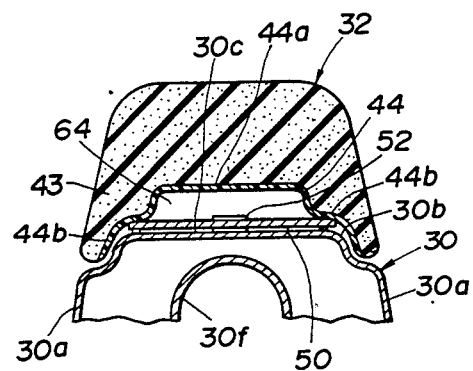
FIG. 3 is a cross-sectional view taken along the line III—III of FIG. 2.
Figure 4:
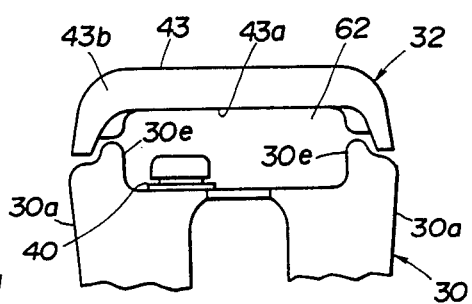
FIG. 4 is a view taken along the line IV—IV of FIG. 2.

As best shown in FIG. 2, the main pipe 12b slants downwardly rearwardly. As shown in FIGS. 2 and 3, the hollow fuel tank 30 is defined by a pair of parallel spaced major portions 30a and 30a of a generally triangular shape and an connective portion 30b extending along the main pipe 12 and interconnecting the major portions 30a and 30a at their upper ends, so that when viewed from the front of the fuel tank 30, it has the shape of a generally inverted U-shape. As best shown in FIG. 2, an upper wall 30c of the connective portion 30b is disposed generally parallel to the main pipe 12b except for its front end section 30d which is disposed generally horizontally, the outer surface of the upper wall 30c defining an upper surface of the fuel tank 30. As shown in FIG. 4, the connective portion 30b has a pair of laterally-spaced bulged sections 30e and 30e formed on and projecting upwardly from the front end section 30d of the upper wall 30c. The fuel tank 30 is secured to the frame 12 with a recess 30f, defined by the pair of opposed major portions 30a and 30a the connective portion 30b, being fitted on the main pipe 12b. A fuel inlet 40 through which the fuel tank 30 is charged with fuel is provided in the front end section 30d of the upper wall 30c, and a fuel cap 42 is removably fitted in the fuel inlet 40.

The seat 32 is mounted on the frame 12 above the fuel tank 30, and comprises an elongated cushioning member 43 of a resilient material having a longitudinal groove 43a of a generally inverted U-shaped cross-sectional formed in a bottom thereof, and an elongated rigid bottom plate 44 of a generally inverted channel-shaped cross-section fitted in the groove 43a and secured thereto, the bottom plate 44 being made of a synthetic resin and defined by a base 44a and a pair of opposed arms 44b and 44b interconnected by the base 44a at their upper edges, as best shown in FIG. 3. The base 44a of the bottom plate 44 is curved convexly downwardly intermediate opposite ends thereof and includes a front portion 44c slanting downwardly rearwardly and disposed above the upper surface of the fuel tank 30 is spaced opposed relation thereto, and a rear portion 44d slanting upwardly rearwardly. The front end of the cushioning member 43 is disposed slightly rearwardly of the front end of the fuel tank 30, and a front end portion 43b of the cushioning member 43 is disposed above the front end section 30d of the connective portion 30b in opposed relation thereto, so that the upper surface of the fuel tank 30 is generally entirely covered by the seat 32. The front end of the bottom plate 44 terminates slightly short of the front end of the cushioning member 43, so that the front end portion 43b of the cushioning member 43 can be flexed or bent vertically. The front end portion 43b of an inverted U-shaped cross-section and the bottom plate 44 of an inverted U-shaped cross-section jointly provide a downwardly-opening continuous recess or groove 47 extending along the length of the seat 32.

A hook 48 is secured to an underside of the base 44a at a corner portion 44e thereof into which the front and rear portions 44c and 44d merge. A transverse strip 50 extends between the pair of opposed arms 44b and 44b of the seat bottom plate 44 in spaced relation to the base 44a and riveted thereto. A hook 52 is secured to the upper wall 30c of the fuel tank 30 adjacent to the front end section 30d. The transverse strip 50 engaged with the hook 52, and the hook 48 is engage with a transverse pipe 54 extending between and secured to the parallel spaced seat rails 12c and 12c. Further, the rear end portion of the bottom plate 44 is fastened to the pair of seat rails 12c and 12c through a pair of brackets 56 only of which is shown in FIG. 2. Thus, the seat 32 is held against movement relative to the frame 12.

Figure 5:
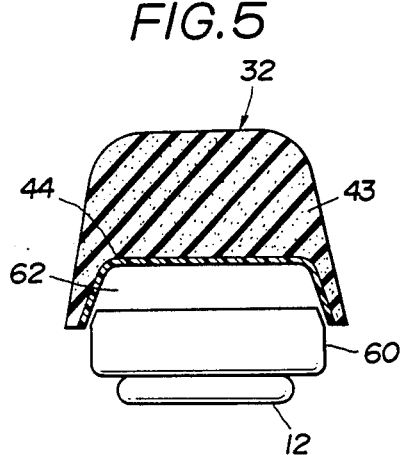
FIG. 5 is a cross-sectional view taken along the line V—V of FIG. 2.
Figure 6:
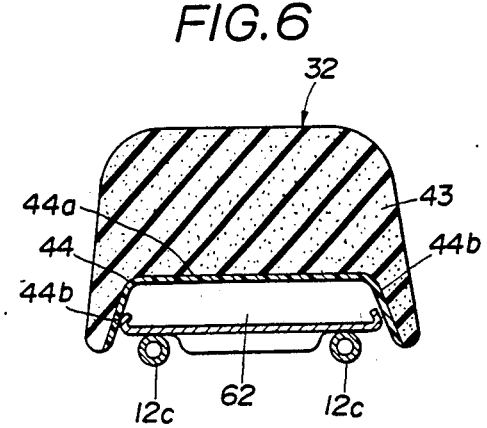
FIG. 6 is a cross-sectional view taken along the line VI—VI of FIG. 2.
Figure 14:
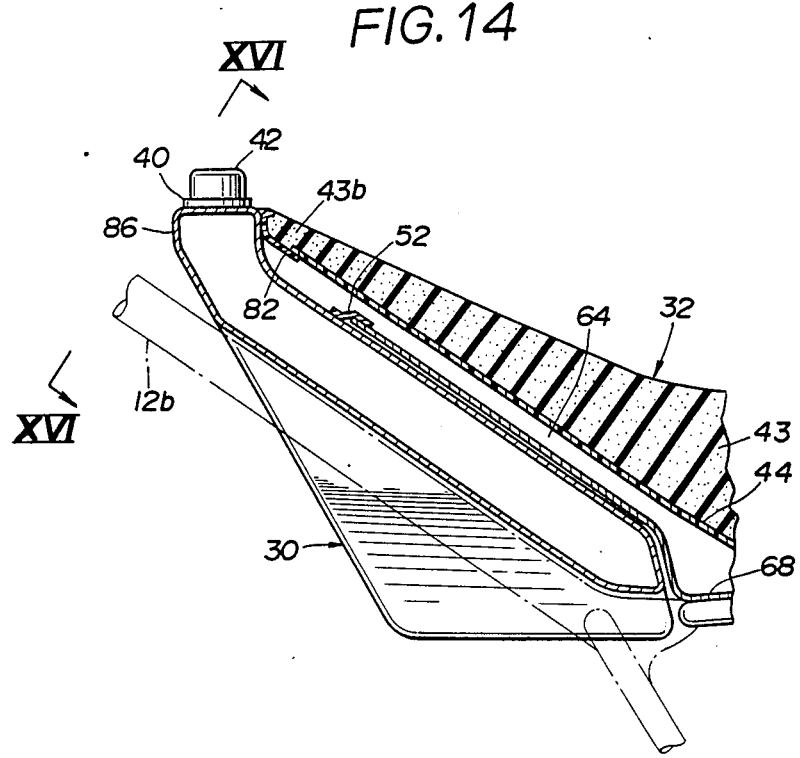
FIG. 14 is a cross-sectional view of a portion of a further modified motorcycle.
Figure 15:
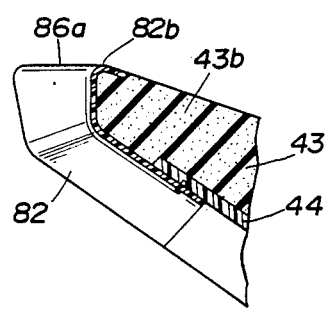
FIG. 15 is a partly-broken, perspective view of front protions of the seat and fuel tank.

The air clear 16 is mounted on the frame 12 beneath the corner portion 44e of the seat 32 and is disposed rearwardly of the fuel tank 30. A transverse seal plate 60 of a generally triangular cross-section is interposed between the fuel tank 30 and the air cleaner 16 and extends between the pair of opposed arms 44b and 44b of the bottom plate 44 as shown in FIGS. 5 and 6, the seal plate 60 being attached to the seat rails 12c and 12c in spaced relation to the base 44a.

The connective portion 33b of the fuel tank 30 is received in the recess 47 of the seat 32 to provide a first passageway 58 between the bottom of the seat 32 and the upper surface of the fuel tank 30. More specifically, those portions of the opposed arms 44b and 44b lying between the front end of the bottom plate 44 and a point adjacent to the seal plate 60 flare downwardly at their lower portions and are curved away from each other. The connective portion 33b is reduced in width at its upper portion, and the opposite sides of this reduced upper portion are disposed in contiguous relation to the curved lower portions of the arms 44b and 44b, respectively, to provide a labyrinth seal therebetween. The fuel cap 42 is disposed adjacent to an inlet 58a of the first passageway 58. The inlet 58a of the first passageway 58 is directed toward the head pipe 12a. As best shown in FIG. 2, the fuel tank 30 terminates short of the corner portion 44e of the seat 32. The bottom of the seat 32 and the seal plate 60 define a second passageway 62 which leading to an inlet 16a of the air cleaner 16. And, the first and second passageways 58 and 62 jointly provide a continuous air intake passageway 64.

As best shown in FIG. 4, the fuel inlet 40 is offset from the median plane or the center line of the fuel tank 30, that is to say, from the center of the connective portion 30b. If the fuel inlet 40 is provided at the center of the connective portion 30b, the fuel inlet 40 is disposed too close to the bottom of the connective portion 30b, so that the liquid level in the fuel tank can not be inspected clearly. The pair of opposed bulged portions 30e and 30e are received in the front end portion 43b of the cushioning member 43 in contiguous relation to the inner surfaces of opposed arms 43c and 43c thereof to provide a labyrinth seal therebetween.

With this construction, during the running of the motorcycle 10, the ambient air is introduced into the inlet 58 of the passageway 58, that is to say, the inlet of the air intake passageway 64, and is fed through the passageway 64 to the air cleaner 16. Since the air intake passageway 64 is provided above the fuel tank 30, that is to say between the seat 32 and the fuel tank 30, the size of the fuel tank 30 is not unduly increased. In addition, the design of the seat 32 can be suitably modified without having to modify the fuel tank 30. This is advantageous since the manufacture or processing of the seat is much easier than that of the fuel tank.

The air intake passageway 64 is isolated from the relatively hot air surrounding the engine 14 and an radiator, and besides the inlet of the passageway 64 is disposed at a relatively high level near the handle 23. Therefore, a relatively clean ambient air is supplied to the air cleaner 16 even during the running on a rough road or the like.

Since the seat 32 covers generally the entire upper surface of the fuel tank 30, the seat 32 serves as a protective means for the fuel tank 30. In addition, the seat 32 is extended forwardly to cover the upper surface of fuel tank 30 and therefore has an increased length, so that the riding position of the rider can be suitably varied in accordance with running conditions. Further, there is provided no joint between the seat 32 and the fuel tank which joint is usually stepped, the rider can smoothly move forwardly over the seat 32.

The front end portion 43b of the cushioning member 43 which covers the fuel cap 42 for protective purposes is flexible and is allowed to be flexed upwardly since it is not reinforced by the bottom plate 44. With this arrangement, when filling the fuel tank 30 with fuel, the front end portion 43b is flexed upwardly to enable easy access to the fuel cap 42.

FIGS. 7 and 8 show a modified form of the invention which differs from the motorcycle 10 of FIGS. 1 to 6 in that an elongated cover plate 68 is received in the lower portion of the inverted U-shaped bottom plate 44, and extends laterally between the opposed arms 44b and 44b in parallel spaced relation to the base 44a of the bottom plate 44 and also extends longitudinally along the base 44a, the cover plate 68 being riveted to the opposed arms 44b and 44b. The front end of the cover plate 68 is engaged with the hook 52 while the rear end is directed downwardly and engaged with the front edge of the seal plate 60. In this embodiment, the transverse strip 50 is omitted. The bottom of the seat 32 and the cover plate 68 define a first passageway 58 which cooperates with the second passageway 62 to provide a continuous air intake passageway 64. By virtue of the provision of the cover plate 68, the air intake passageway 62 has a better air-tightness.

FIGS. 9 to 11 show another modified form of the invention which differs from the motorcycle 10 of FIGS. 1 to 6 in that a modified bottom plate 44 is used to obviate the need for the seal plate 60. More specifically, the base 44a of the bottom plate 44 is covexed downwardly intermediate opposite ends thereto to provide a corner portion 70 defined by a front wall 70a and a rear wall 70b extending rearwardly therefrom at an angle. The front wall 70a is disposed in contiguous relation to the rear end of the fuel tank 30 to close the rear end of a first passageway 58, and the rear wall 70b closes the inlet 16a of the air cleaner 16. A closure plate 72 of an inverted U-shaped cross-section is fitted on the base 44a at its front and rear ends to close the corner portion 70 to form a second passageway 62 of a generally triangular cross-section, the closure plate 72 serving to support the central portion of the cushioning member 43. A first aperture 74 is formed through the front wall 70a to communicate the first passageway 58 with the second passageway 62, the first aperture 74 being disposed at a level above the upper surface of the fuel tank 30. And, a second aperture 76 is formed through the rear wall 70b to communicate the second passageway 62 with the air cleaner 16. The provision of the corner portion 70 enables the seat 32 to be positioned in place easily when installing the seat 32 on the frame 12. Further, the front wall 70 having the first aperture 74 disposed at a level slightly above the upper surface of the fuel tank 30 advantageously prevents water of the like from intruding into the second passageway 62.

FIG. 12 shows a further modified form of the invention which differs from the embodiment of FIGS. 7 and 8 in that a modified cover plate 68 is provided to obviate the need for the seal plate 60. More specifically, the cover plate 68 extends longitudinally from the hook 52 to the corner portion 44e, and the rear end of the cover plate 68 is secured to the bottom plate 44 at the corner portion 44e. A rear end portion 68a of the cover plate 68 closes the inlet 16a of the air cleaner 16. The bottom of the seat 32 and the cover plate 68 define an air intake passageway 64. An aperture 80 is formed through the rear end portion 68a to communicate the air intake passageway 64 with the air cleaner 16. With this construction, the air intake passageway 64 has a better air-tightness.

FIG. 13 shows a further modified form of the invention which differs from the embodiment of FIG. 12 in that a cover plate 68 of a U-shaped cross-section is secured to a base 44a of a bottom plate 44 and that an upper wall 30c of the connective portion 30 is raised longitudinally at lateral edge portions to provide a pair of parallel spaced ridges 30g and 30g and a longitudinal recess 30h. The cover plate 68 of a U-shaped cross-section is fitted in the longitudinal recess 30h. By virtue of the pair of ridges 30g and 30g, the upper wall 30c has an increased strength. In addition, the seat 32 is positively prevented from lateral movement since the cover plate 68 is fitted in the recess 30h.

Figure 16:
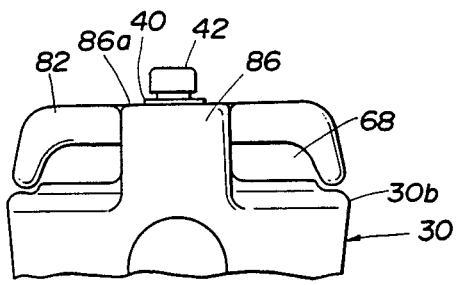
FIG. 16 is a view taken along the line XVI—XVI of FIG. 14.
Figure 17:
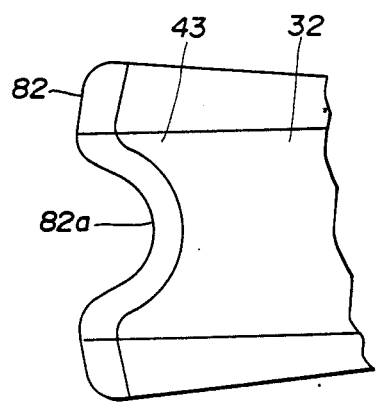
FIG. 17 is a top plan view of the fron portion of the seat.

FIGS. 14 to 17 show a further modified form of the invention which differs from the embodiment of FIG. 12 in that a flexible backing or end member 82 of a synthetic resin is attached to the flexible front end portion 43b of the cushioning member 43. The end member 82 is of a hollow construction and is generally inverted U-shape when viewed from the front of the seat 32 as best seen in FIG. 16. In this embodiment, the connective portion 30b of the fuel tank 30 is raised at its front end to provide a hollow neck 86 which is disposed centrally of the width of the fuel tank 30. The end member 82 has at its front end a central recess 82a, as shown in FIG. 17. The end member 82 is snugly fitted over the front end portion 43b of the cushioning member 43 with the central recess 82a fitted on the neck 86 and is secured at its rear end to the front end of the bottom plate 44 by fastening means 84. The neck 86 has an upper flat wall 86a disposed at a level substantially equal to the upper edge 82b of the end member 82. The fuel inlet 40 is formed in the upper wall 86a, and the fuel cap 42 is removably fitted in the fuel inlet 40, the fuel cap 42 projecting upwardly beyond the upper edge 82b of the end member. The end member 82 serves to prevent the front end of the seat 32 from being subjected to wear. Conventionally, the rigid bottom plate is further extended and turned back at its front end to cover the front end portion of the cushioning member 43, and although not shown in the drawings, a covering sheet of artificial leather or the like is attached over the cushioning member 43. Such a leather covering sheet is subjected to undue tension or load by the turned-back end of the bottom plate when the rider sits on the seat 32, so that the covering sheet is susceptible to damage. Since the end member 82 is so flexible that it is suitably flexed when the covering sheet is subjected to tension, thereby preventing damage thereto.

Figure 18:
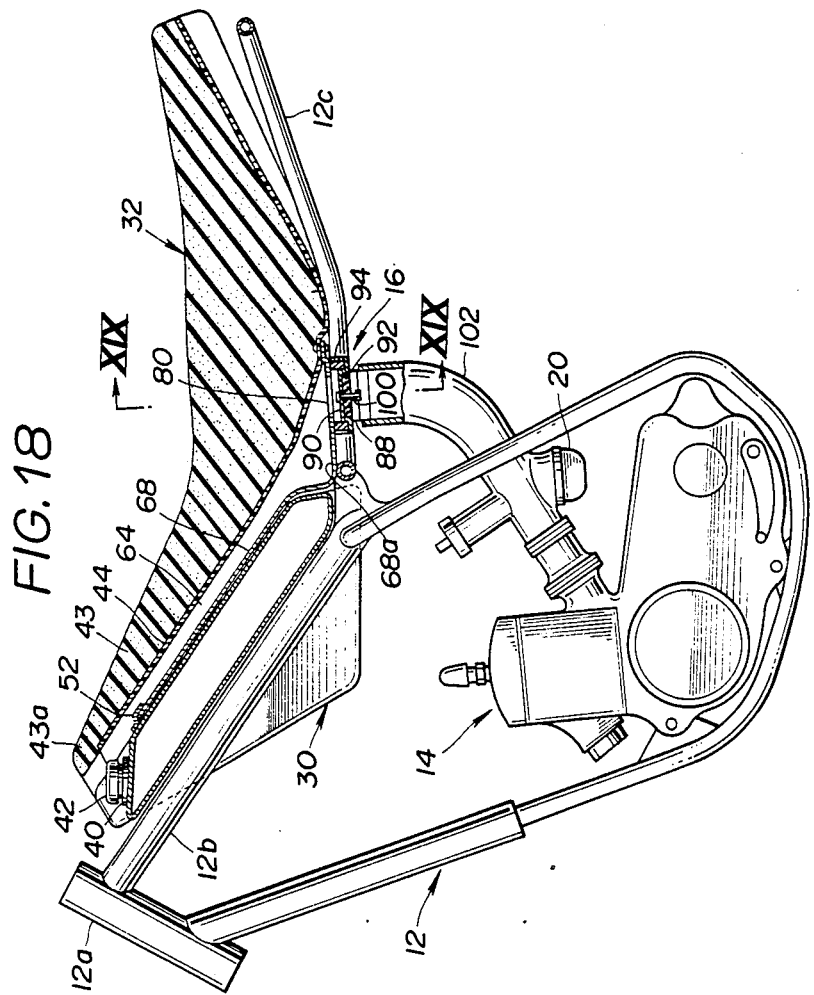
FIG. 18 is a view of a portion of a further modified motorcycle.
Figure 19:
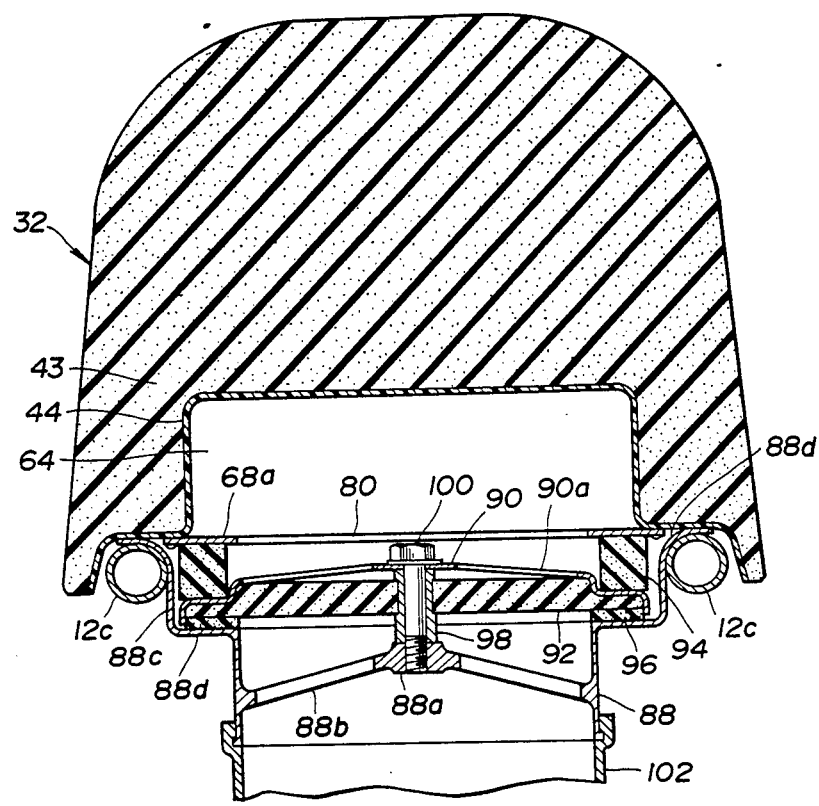
FIG. 19 is a view taken along the line XIX—XIX of FIG. 18.

FIGS. 18 and 19 shows a further modified form of the invention which differs from the embodiment of FIG. 12 in that an air cleaner 16 of a compact size is employed. The air cleaner 16 comprises a tubular housing 88 having a boss 88a disposed coaxially in the housing 88 and a plurality of radial arms 88b extending between the inner peripheral surface of the housing 88 and the central boss 88a. The housing 88 has a greater diameter portion 88c at one end portion thereof to provide a shoulder 88d, the greater diameter portion 88c being received in the lower portion of the bottom plate 44. The greater diameter portion 88c flares at its free end to provide a flange 88d which is interposed between the bottom plate 44 and the seat rails 12c and 12c. A dish-shaped support plate 90 is received within the greater diameter portion 88c and has a plurality of radial slots 90a. An air cleaner element 92 is snugly fitted in the support plate 90. A first seal ring 94 is interposed between the rear end portion 68a of the cover plate 68 and the support plate 90, the inner diameter of the seal ring 94 being slightly greater in size than the aperture 80 formed through the rear end portion 68a. A second seal ring 96 is interposed between the air cleaner element 92 and the shoulder 88d, the inner diameter of the second seal ring 96 being equal to the inner diameter of the tubular housing 88. A collar 98 extends through the air cleaner element 92 at its center and is held against the support plate 92 and the boss 88a of the housing 88 at opposite ends thereof. A bolt 100 is passed through the collar 98 and is threaded into the boss 88a to fix the support plate 92, the air cleaner element 92 and the second seal ring 96 to the housing 88. A connecting tube 102 extends from the lower end of the housing 88 to the carbureter 20.

Thus, the air cleaner element 92 is disposed adjacent to the aperture 80 and is disposed in opposed relation thereto via the support plate 92. Therefore, the air cleaner 16 can be of a compact size.

What is claimed is:
1. A motorcycle comprising:
   (a) an elongated frame having front and rear ends;
   (b) an engine mounted on said frame;
   (c) a fuel tank mounted on said frame above said engine and having an upper surface extending along a length of the frame;
   (d) an elongated seat mounted on said frame above said fuel tank along the length of said frame, said seat having a bottom having a portion extending along the length thereof and disposed in spaced opposed relation to said upper surface of said fuel tank to define an air intake passageway therebetween, said passageway having an open front end opening toward the front end of said frame and having a rear open end, said seat having a front end disposed near to a front end of said fuel tank so that said seat covers said upper surface of said fuel tank generally entirely; and
   (e) an air cleaner operatively connected to said engine and disposed rearwardly of said fuel tank, the rear open end of said passgeway being in communication with said air cleaner whereby the ambient air can be fed to said air cleaner through said air intake passageway.

2. A motorcycle according to claim 1, in which said seat comprises a bottom plate of a generally inverted U-shaped cross-section and a cushioning member of a resilient material secured on an upper surface of said bottom plate, a front end of said bottom plate terminating slightly short of a front end of said cushioning member, so that said front end portion of said cushioning member can be flexed vertically, said front end portion of said cushioning member being disposed above a front end portion of said fuel tank in opposed relation thereto, said fuel tank having a fuel inlet provided at the front end portion of said fuel tank in opposed relation to said front end portion of said cushioning member, and an upper portion of said fuel tank being received in a lower portion of said bottom plate of an inverted U-shaped cross-section in contiguous relation thereto to define said air intake passageway therebetween.

3. A motorcycle according to claim 2, in which said fuel tank has a pair of opposed bulged portions formed on the upper surface thereof adjacent to lateral edges thereof at the front end portion thereof, said front end portion of said cushioning member being of a generally inverted U-shaped cross-section, and said pair of bulged portions being received in said front end portion of said cushioning member in contiguous relation thereto.

4. A motorcycle according to claim 2, in which said fuel inlet is offset from a medium plane of said fuel tank.

5. A motorcycle according to claim 1, in which said seat comprises a bottom plate of a generally inverted U-shaped cross-section, a seal plate being interposed between said fuel tank and said air cleaner and received in a lower portion of said bottom plate to form a rear portion of said air intake passageway.

6. A motorcycle according to claim 1, in which said seat comprises a bottom plate of a generally inverted U-shaped cross-section, there being provided an elongated cover plate interposed between said bottom plate and said fuel tank and secured to said bottom plate, said cover plate being received in a lower portion of said bottom plate and extending therealong to form said air intake passageway.

7. A motorcycle according to claim 6, in which said cover plate is secured at its rear end to said bottom plate to close the rear end of said air intake passageway, a rear end portion of said cover plate having an aperture through which said air intake passageway communicates with said air cleaner.

8. A motorcycle according to claim 6, in which said cover plate is of a generally U-shaped cross-section, the upper surface of said fuel tank being longitudinally recessed centrally of the width thereof to provide a longitudinal recess, and said U-shaped cover plate being snugly received in said recess.

9. A motorcycle according to claim 1, in which said seat comprises a bottom plate of a generally inverted U-shaped cross-section, said bottom plate being convex downwardly intermediate opposite ends thereto to provide a corner portion defined by a front wall and a rear wall extending rearwardly therefrom at an angle, said front wall being disposed in contiguous relation to the rear end of said fuel tank to close the rear end of said air intake passageway, there being provided a closure plate secured to the upper surface of said bottom plate to close said corner portion to form a second passageway, said closure plate being held in contact with the bottom of said seat, said front wall having a first aperture formed therethrough through which said air intake passageway communicates with said second passageway, said first aperature being disposed at a level above the upper surface of the rear end of said fuel tank, and said rear wall having a second aperture through which said second passageway communicates with said air cleaner.

10. A motorcycle according to claim 7, in which said air cleaner comprises a housing attached to said frame, and an air cleaner element mounted within said housing and disposed adjacent to said aperture through the rear end portion of said cover plate to cover it.

11. A motorcycle according to claim 2, in which a flexible end member of a hollow construction is fitted on said front end portion of said cushioning member and secured to the front end of said bottom plate, said end member having a central recess at its front end, said fuel tank being raised at its front end to provide a neck disposed centrally of the width thereof, and said neck being fitted in said central recess of said end member.

* * * * *